(12) United States Patent
Utsumi et al.

(10) Patent No.: US 7,999,425 B2
(45) Date of Patent: Aug. 16, 2011

(54) CONTROLLER-INTEGRATED ROTATING ELECTRIC MACHINE

(75) Inventors: Yoshinobu Utsumi, Chiyoda-ku (JP); Masahiko Fujita, Chiyoda-ku (JP); Yoshiharu Hayashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 69 days.

(21) Appl. No.: 12/424,183

(22) Filed: Apr. 15, 2009

(65) Prior Publication Data

US 2010/0102683 A1    Apr. 29, 2010

(30) Foreign Application Priority Data

Oct. 27, 2008    (JP) .................................. 2008-275708

(51) Int. Cl.
*H02K 9/02*    (2006.01)
(52) U.S. Cl. ........................................ 310/68 D; 310/71
(58) Field of Classification Search ................ 310/68 D, 310/71
See application file for complete search history.

(56) References Cited

U.S. PATENT DOCUMENTS 5,682,070 A * 10/1997 Adachi et al. .................... 310/71
5,977,669 A * 11/1999 Yoshida et al. .............. 310/68 D

FOREIGN PATENT DOCUMENTS

| JP | 02-266854 | 10/1990 |
|---|---|---|
| JP | 2004-222428 | 8/2004 |
| JP | 2006-180597 | 7/2006 |
| JP | 2006-211835 A | 8/2006 |
| JP | 2007-174855 | 7/2007 |
| JP | 2007-336638 | 12/2007 |
| WO | 2006080397 A1 | 8/2006 |

* cited by examiner

*Primary Examiner* — Dang D Le
(74) *Attorney, Agent, or Firm* — Sughrue Mion, PLLC

(57) ABSTRACT

Assembly of a controller-integrated rotating electric machine is facilitated. In a controller-integrated rotating electric machine provided with a rotating electric machine unit having a rotor (2), a stator (3), and brackets (4, 5); a plurality of stator current switching circuit units (13) that are attached on an insulator cover (14) mounted on the brackets (4, 5); and a controller unit having a control circuit board (102), the stator current switching circuit unit (13) is provided with a plurality of switching elements (13*a*) and a plurality of switching elements (13*b*); a pair of heat sinks (13*g*, 13*h*) with which the drain terminals of the switching elements (13*a*, 13*b*) are connected; and a pair of electric connection members (17, 18) that pull out the terminals of the switching elements (13*a*, 13*b*) and that hold and integrate the pair of heat sinks (13*g*, 13*h*). Additionally, the plurality of stator current switching circuit units (13) is fixed to a relaying connection member (16), and electric connections between the stator current switching circuit units (13) and outside members are performed by the intermediary of the relaying connection member (16).

7 Claims, 15 Drawing Sheets (a)

(b)

CONTROLLER-INTEGRATED ROTATING ELECTRIC MACHINE

BACKGROUND OF THE INVENTION

1. Field of the Invention

The present invention relates to a method of facilitating the assembly of a so-called controller-integrated rotating electric machine equipped with a power element unit that performs control of an inverter.

2. Description of the Related Art

For example, Japanese Patent Application Laid-Open No. 2006-211835 discloses an example of so-called controller-integrated rotating electric machine. The objective of Japanese Patent Application Laid-Open No. 2006-211835 is to improve the coolability of a controller, downsize the whole controller, and eliminate the loss due to a voltage drop caused in lead wires between the controller and a rotating electric machine. The controller-integrated rotating electric machine is configured in such a way that there is provided a power switching module that includes at least one pair of switching elements that form an upper arm and a lower arm and performs switching-control of a rotating electric machine, the drain terminals of the switching elements included in the respective arms of the power switching module are connected with separate heat sinks without any insulators, and the separate heat sinks are integrated by the intermediary of an insulator.

The foregoing conventional technology has the following problem. Stator current switching circuit units for U phase, V phase, and W phase are separately configured and fixed; therefore, when the stator current switching circuit units are integrated with a rear cover and a control circuit board, the positional accuracies of signal-connection positions for signal conductors becomes low, whereby there is caused a positional displacement between the pin of the signal conductor and the hole thereof. As a result, it has been a problem in terms of the productivity that the stator current switching circuit units cannot readily be integrated.

SUMMARY OF THE INVENTION

A controller-integrated rotating electric machine according to the present invention is provided with a rotor having a rotation axle; a stator that is disposed in such a way as to surround the rotor and has a stator winding; a rotating electric machine unit having a bracket that holds the rotor and the stator; a plurality of stator current switching circuit units that are attached on an insulator cover mounted on the bracket and control electric currents that flow in the stator; and a controller unit having a control circuit board that is electrically connected with the stator current switching circuit units. In the controller-integrated rotating electric machine, each of the stator current switching circuit units is provided with a plurality of switching elements, a pair of heat sinks with which the drain terminals of the switching elements are connected, and a pair of electric connection members that pull out the terminals of the switching elements and that hold and integrate the pair of heat sinks. Additionally, in the controller-integrated rotating electric machine, the plurality of stator current switching circuit units is fixed to a relaying connection member, and electric connections between the stator current switching circuit units and outside members are performed by the intermediary of the relaying connection member.

According to the present invention, assembly of a controller-integrated rotating electric machine is facilitated, whereby the manufacturing cost can be reduced.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
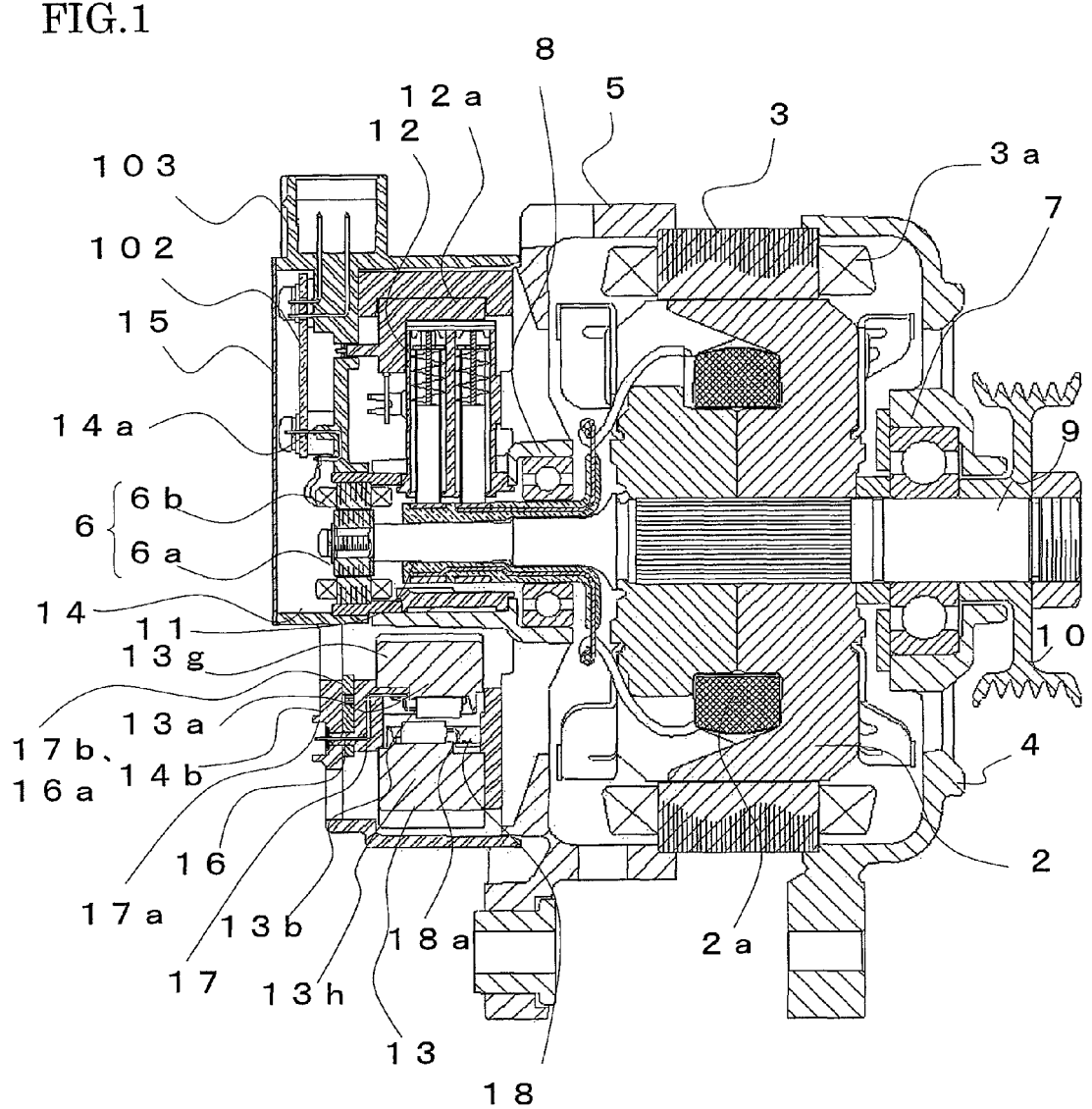
FIG. 1 is a cross-sectional view of a controller-integrated rotating electric machine according to Embodiment 1 of the present invention.
Figure 2:
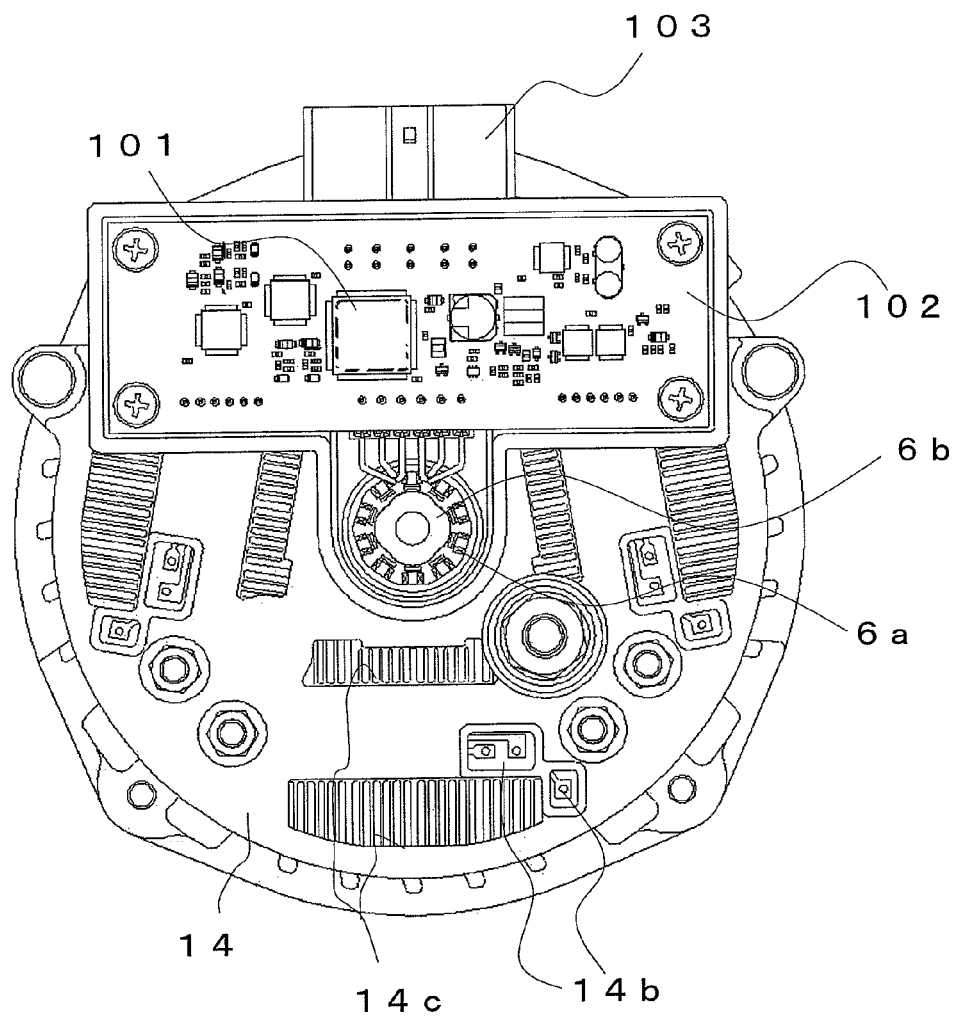
FIG. 2 is a rear view illustrating a controller-integrated electric rotating machine according to Embodiment 1 in the case where a metal cover is removed.
Figure 3:
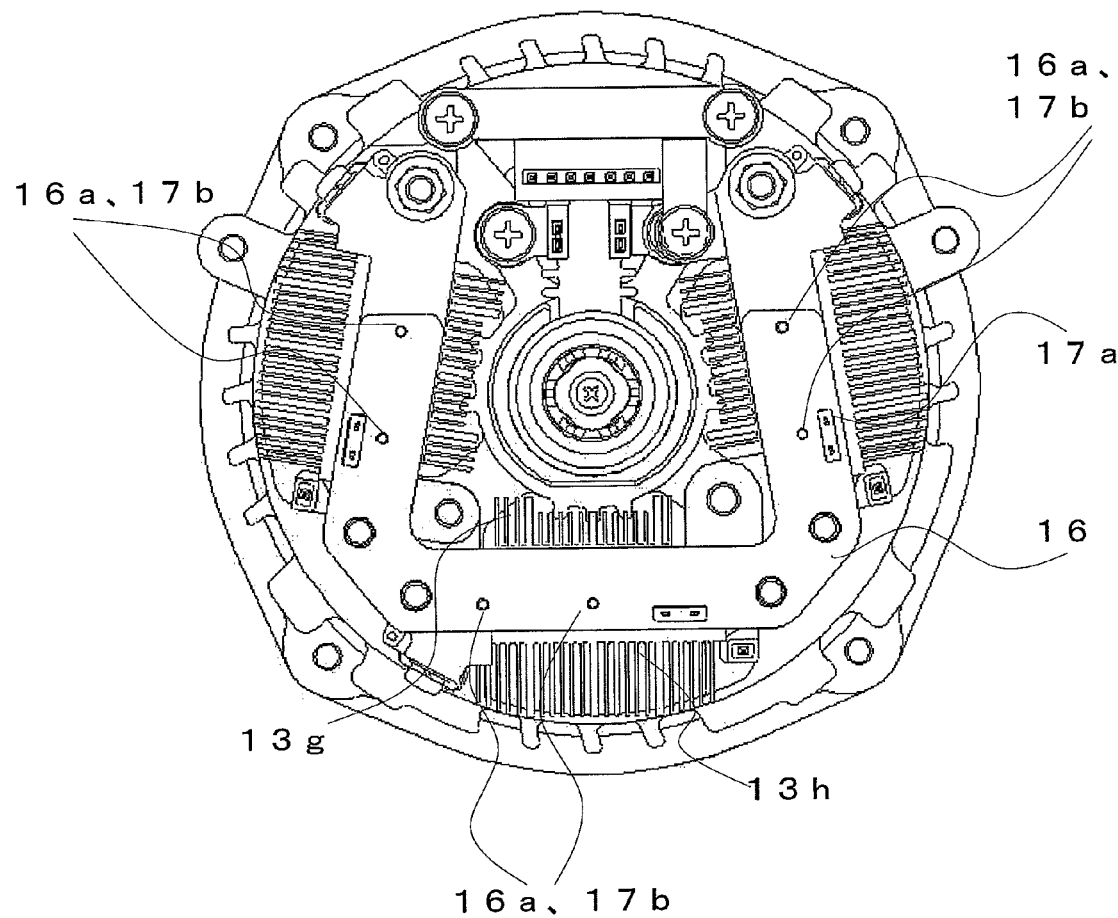
FIG. 3 is a rear view illustrating a controller-integrated electric rotating machine according to Embodiment 1 in the case where a resin cover is removed.

FIG. 1 is a cross-sectional view illustrating a controller-integrated rotating electric machine (referred to as a rotating electric machine, hereinafter) according to Embodiment 1 of the present invention; FIG. 2 is a rear view of a rotating electric machine in the case where a metal cover is removed;

FIG. 3 is a rear view of a rotating electric machine in the case where a resin cover is removed.

In FIGS. 1 to 3, a controller-integrated rotating electric machine is provided with a rotor 2 around which a magnetic-field winding 2a is wound, a stator 3 around which stator windings 3a for three phases are wound, a front bracket 4 and a rear bracket 5 that contain the rotor 2 and the stator 3, a rotation axle 9, of the rotor 2, that is rotatably supported by the front bracket 4 and the rear bracket 5 by the intermediary of bearings 7 and 8, respectively, and a pulley 10 fixed on the front end of the rotation axle 9. Two slip rings 11 are integrated on the rear end of the rotation axle 9. A magnetic pole position detection sensor 6, arranged outside the rear bracket 5, is disposed coaxially with the rotation axle 9, in the vicinity of the rear end of the rotation axle 9, and detects the position of the magnetic pole of the rotation axle 9, i.e., the rotor 2. In the vicinity of the rear end of the rear bracket 5, a brush 12 that slidably makes contact with the slip ring 11 is provided in such a way as to be held by a brush holder 12a.

The magnetic pole position detection sensor 6 is configured with a sensor stator 6a and a sensor rotor 6b; the sensor rotor 6b formed of an iron core only is rotatably provided inside the sensor stator 6a. The sensor rotor 6b is fixed on the rotation axle 9.

A stator current switching circuit unit 13 for supplying AC power to the stator windings 3a is fixed on the rear bracket 5 by means of a bolt and a nut (unillustrated) pressed into the rear bracket 5. The stator current switching circuit unit 13 is provided with a plurality of switching elements 13a and a plurality of switching elements 13b; an inner heat sink 13g and an outer heat sink 13h that are connected with the switching elements 13a and 13b, respectively, and serve as electrode members; and electric connection members 17 and 18. Connection among the switching elements is performed with the heat sinks 13g and 13h and conductive members 17a and 18a that are inserted into the electric connection members 17 and 18, respectively, and molded; the switching elements are connected with a control circuit board 102 via a relaying wiring member 14b. A great number of radiating fins are provided at respective sides, of the heat sinks 13g and 13h, which are opposite to the corresponding sides on which the switching elements 13a and 13b are fixed.

Figure 4:
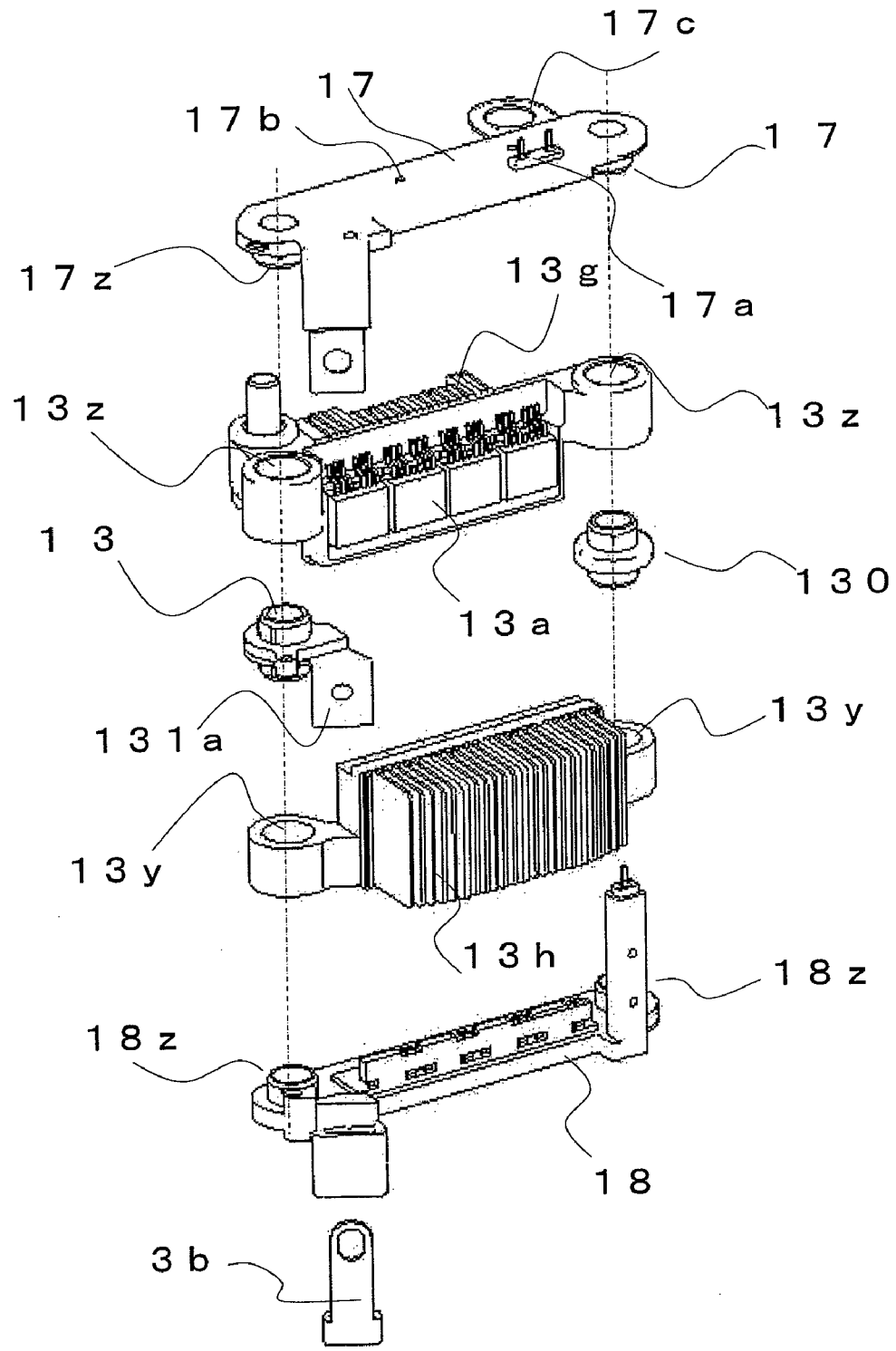
FIG. 4 is an exploded perspective view of a stator current switching circuit unit according to Embodiment 1.

FIG. 4 is an exploded perspective view illustrating the assembly structure of the stator current switching circuit unit 13. In FIG. 4, the stator current switching circuit unit 13 is divided into three sections for three phases (U phase, V phase, and W phase); FIG. 4 illustrates one section for one phase. In each of the sections, a pair of heat sinks including the inner heat sink 13g and the outer heat sink 13h is provided. On the inner heat sink 13g, four switching elements 13a that configure an upper arm are arranged in parallel; the drain terminals, which are the rear-side electrodes of the switching elements 13a, are bonded directly to the inner heat sink 13g, by means of soldering or the like. In contrast, as far as the switching elements 13b that configure a lower arm are concerned, although unillustrated, the drain terminals, which are the rear-side electrodes of the four switching elements, are also bonded directly to the outer heat sink 13h, by means of soldering or the like. As a result, each of the heat sinks 13g and 13h has the same electric potential as that of the drain terminal of the switching element with which it is bonded.

The switching element 13a and the electric connection member 17 included in the upper arm are constituted by pressing cylinder portions 17z of the electric connection member 17 into hole portions 13z of the inner heat sink 13g. On the other hand, as is the case with the upper arm, the switching element 13b and the electric connection member 18 included in the lower arm are constituted by pressing cylinder portions 18z of the electric connection member 18 into hole portions 13y of the outer heat sink 13h. The switching element 13a and the electric connection member 17 included in the upper arm and the switching element 13b and the electric connection member 18 included in the lower arm are combined by pressing cylinder portions of relay members 130 and 131 into hole portions 13y and 13z of the heat sinks.

The inner heat sink 13g having a positive electric potential is connected with the positive-polarity terminal of a battery (unillustrated) by the intermediary of a power-source terminal 17c. The source terminal, i.e., the negative-polarity terminal of the switching element 13a included in the upper arm is connected with the conductive member 17a that is inserted into the electric connection member 17 and molded. The source terminal, i.e., the negative-polarity terminal of the switching element 13a pulled out through the conductive member 17a is connected with a relay member 131a; furthermore, the relay member 131a is connected with the outer heat sink 13h, so that the source terminal of the switching element 13a is connected with the drain terminal of the switching element 13b mounted on the outer heat sink 13h. The relay member 131a is also connected with a stator terminal 3b, which is a lead wire terminal of the coil, for each phase (U phase, V phase, W phase), of the stator windings 3a; the relay member 131a and the outer heat sink 13h are fixed to each other, so that the stator terminal 3b is connected with the drain terminal of the switching element 13b mounted on the outer heat sink 13h.

As a result of the foregoing connection configuration, the coil, for each phase, of the stator wirings 3a is electrically connected with the intermediate connection point between the switching element 13a, for the corresponding phase, mounted on the inner heat sink 13g and the switching element 13b mounted on the outer heat sink 13h. Four respective source terminals, i.e., four respective negative-polarity terminals of the switching elements 13b disposed on the outer heat sink 13h are all pulled out through the conductive members 18a, and one end of the conductive member 18a is connected with a ground portion (the rear bracket 5 or the like), so that the source terminals are earthed.

Figure 5:
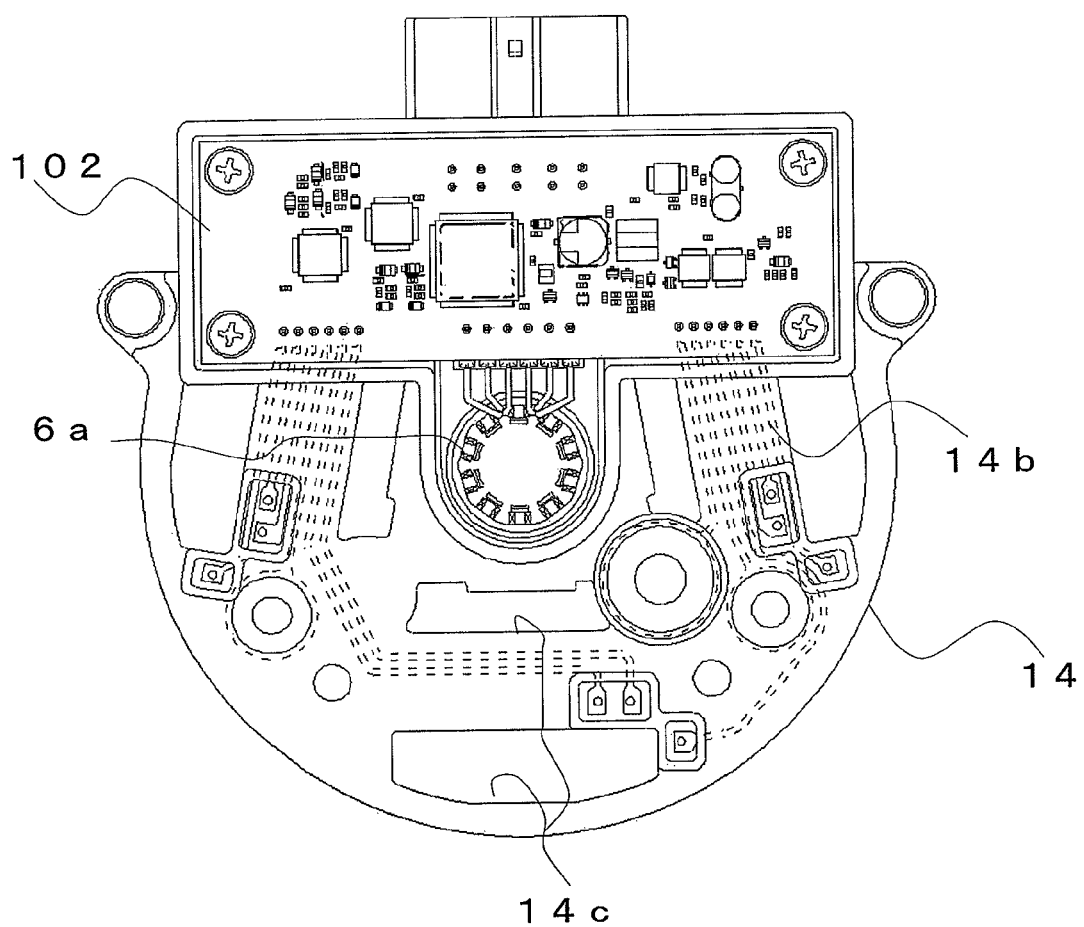
FIG. 5 is a view illustrating a resin cover and a control circuit unit according to Embodiment 1.

A resin cover 14 is disposed behind the stator current switching circuit unit 13 and the brush holder 12a along the axis direction; a metal cover 15 is mounted on the resin cover 14 in order to protect the members inside the resin cover. A connecter 103 is integrated with the resin cover 14 so that signals are received and transmitted between a vehicle and the rotating electric machine. Ventilation holes 14c are provided at positions, in the resin cover 14, that face the radiating fins of the heat sinks 13g and 13h. On the resin cover 14, there is mounted the control circuit board 102 in which a micro computer 101 for controlling a motor is included. As illustrated in FIG. 5, electric connection between the control circuit board 102 and the stator current switching circuit unit 13 is performed by means of signal conductors 14b that are inserted (embedded) into the resin cover 14 and molded. The sensor stator 6a of the magnetic pole position detection sensor 6 is integrally mounted in the resin cover 14 through fitting or molding. By being welded or soldered to a terminal 14a that is inserted into the resin cover 14 and molded, the signal line of the sensor stator 6a is connected with the control circuit board 102.

Figure 6:
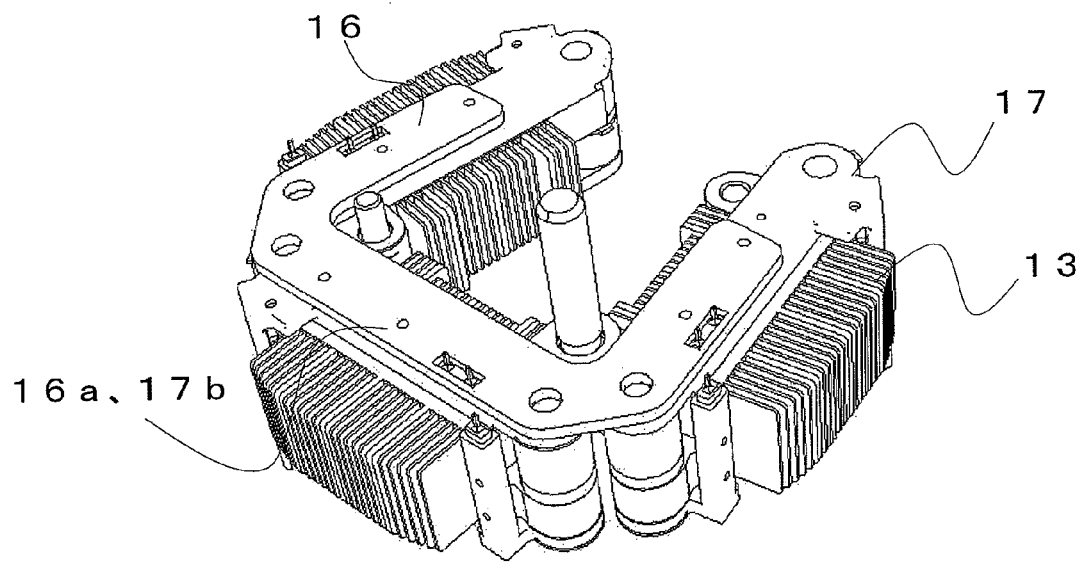
FIG. 6 is a perspective view of an assembly in which stator current switching circuit units according to Embodiment 1 are integrated by use of a relaying connection member.

The stator current switching circuit units 13 for the respective phases are integrally fixed to a relaying connection member 16 that is a U-shaped insulative structure. That is to say, protrusion portions 17b are provided in the electric connection member 17 included in the stator current switching circuit unit 13, and the protrusion portions 17b are pressed into and integrally fixed to holes 16a in the relaying connection member 16, so that the stator current switching circuit units 13 and the relaying connection member 16 are assembled. FIG. 6 illustrates the structure of the assembly. As is clear from FIG. 6, the approximately U-shaped relaying connection member 16 overlaps the base portions of the heat sinks for the stator current switching circuit units 13, i.e., portions, of the heat sinks, excluding the radiating fins. In addition, in the foregoing explanation, the protrusion portions provided in the electric connection member 17 are fit into the holes provided in the relaying connection member 16; however, the holes and the protrusion portions may be provided in the electric connection member 17 and the relaying connection member 16, respectively.

As described above, in the structure according to Embodiment 1, the stator current switching circuit units 13 for U phase, V phase, and W phase are integrally assembled by use of a single relaying connection member 16. In the assembly, the stator current switching circuit units 13 and the relaying connection member 16 are fit to each other by utilizing the holes 16a and the protrusion portions 17b as the references; therefore, the assembly work is facilitated. All the electric connections of the stator current switching circuit unit 13 with the outside members, i.e., the signal conductor 14b and the like are performed by the intermediary of the relaying connection member 16. Accordingly, the stator current switching circuit unit 13 and the relaying connection member, which are to be combined with each other, are separated before being integrated in the rotating electric machine. After that, when the stator current switching circuit units 13 for three phases are integrated with the rotating electric machine, the assembly (assembly structure) integrated in the relaying connection member 16 may be combined with the rotating electric machine; therefore, the assembly is facilitated, whereby the productivity can be enhanced. Moreover, the relaying connection member 16 has a shape that does not cover the cooling paths at the heat sinks 13g and 13h; therefore, the rotating electric machine can be constituted without deteriorating the coolability.

Embodiment 2

Figure 10:
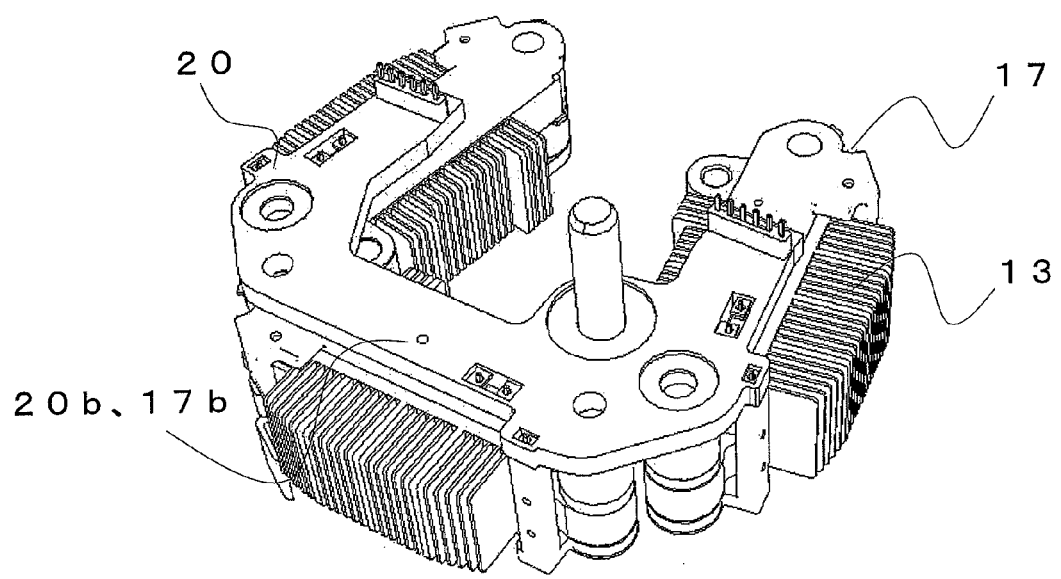
FIG. 10 is a perspective view of an assembly in which stator current switching circuit units according to Embodiment 2 are integrated by use of a relaying connection member.
Figure 7:
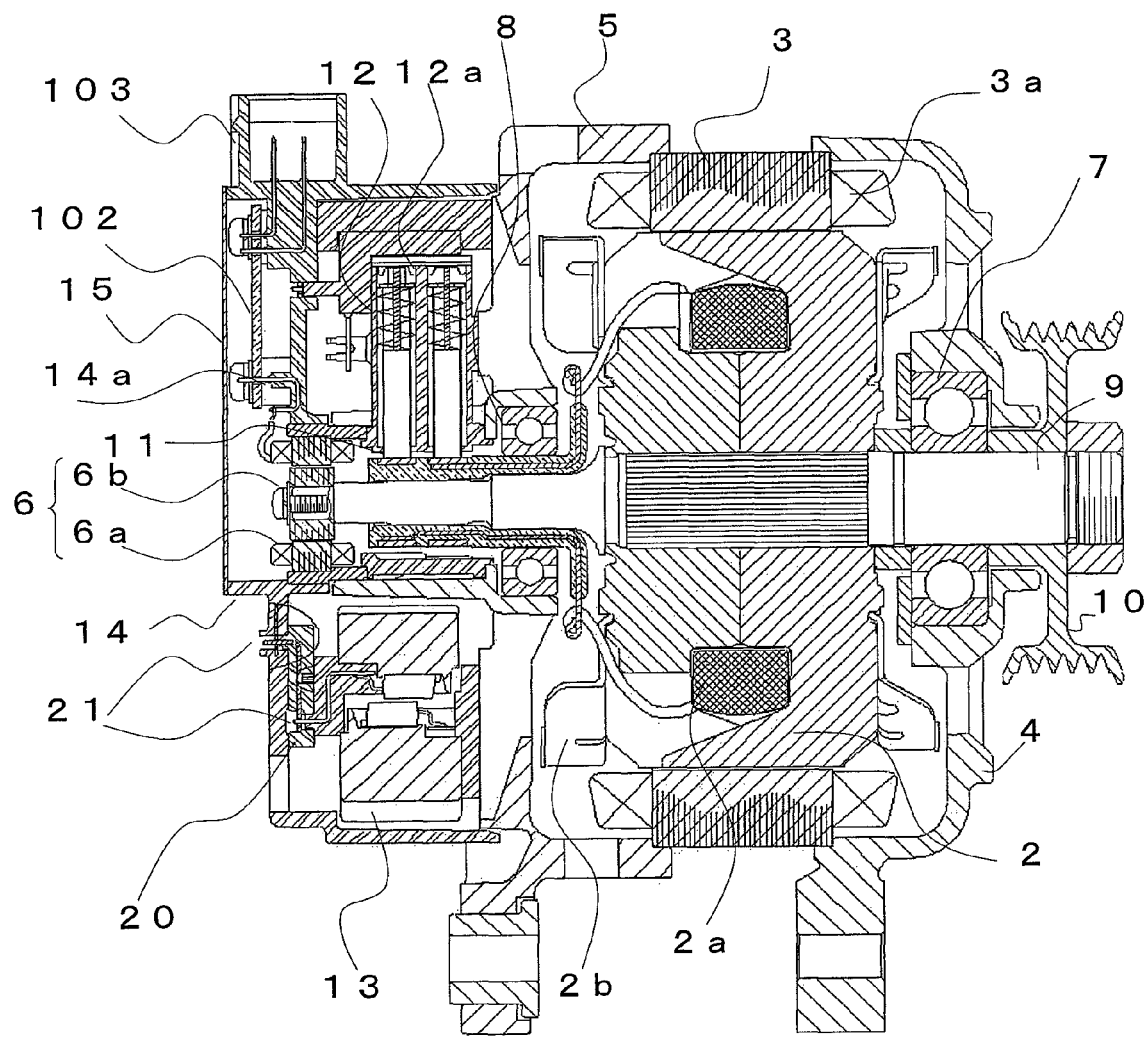
FIG. 7 is a cross-sectional view of a controller-integrated rotating electric machine according to Embodiment 2 of the present invention.
Figure 8:
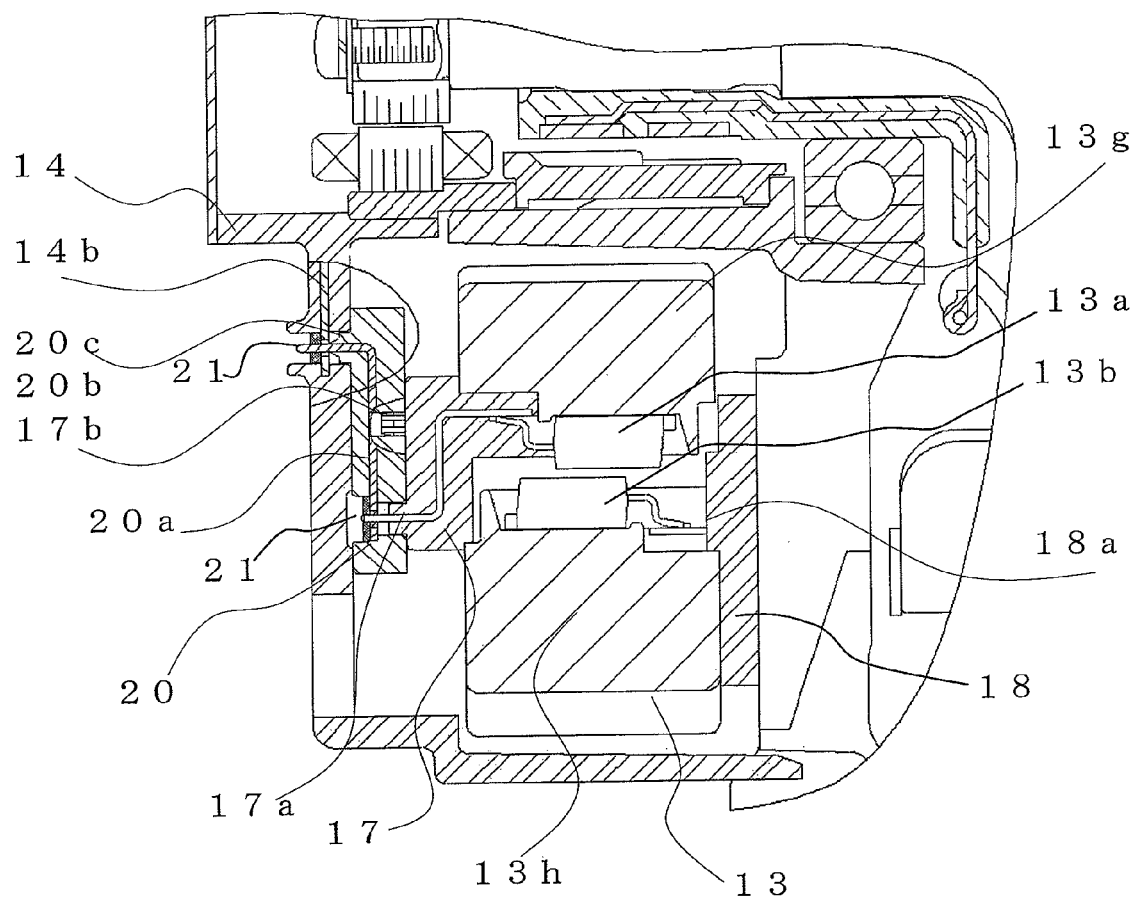
FIG. 8 is an enlarged cross-sectional view of a stator current switching circuit unit according to Embodiment 2.
Figure 9:
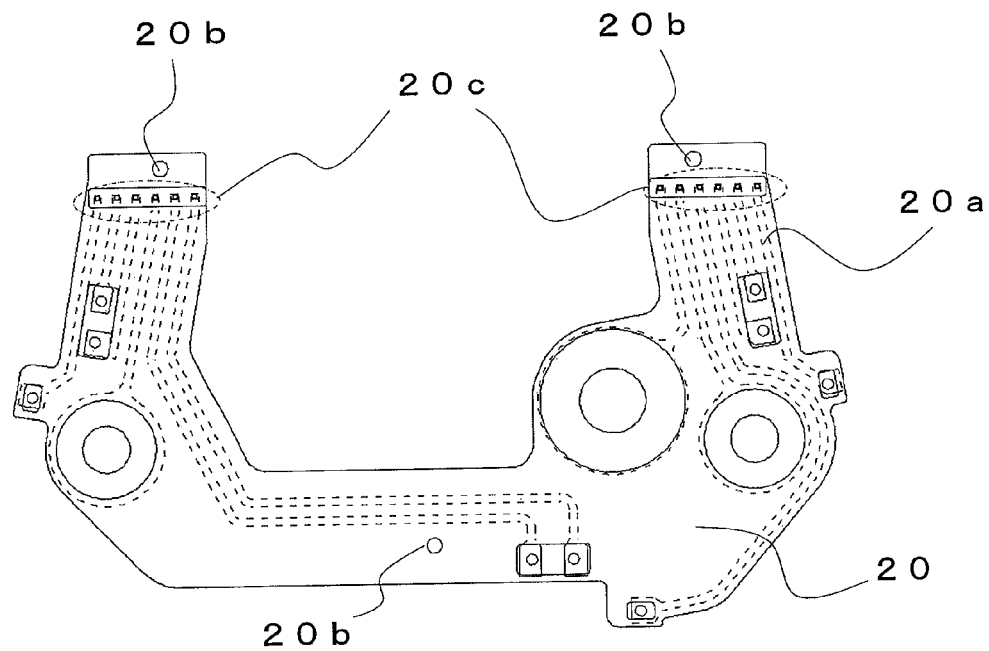
FIG. 9 is a view illustrating a relaying connection member according to Embodiment 2.
Figure 11:
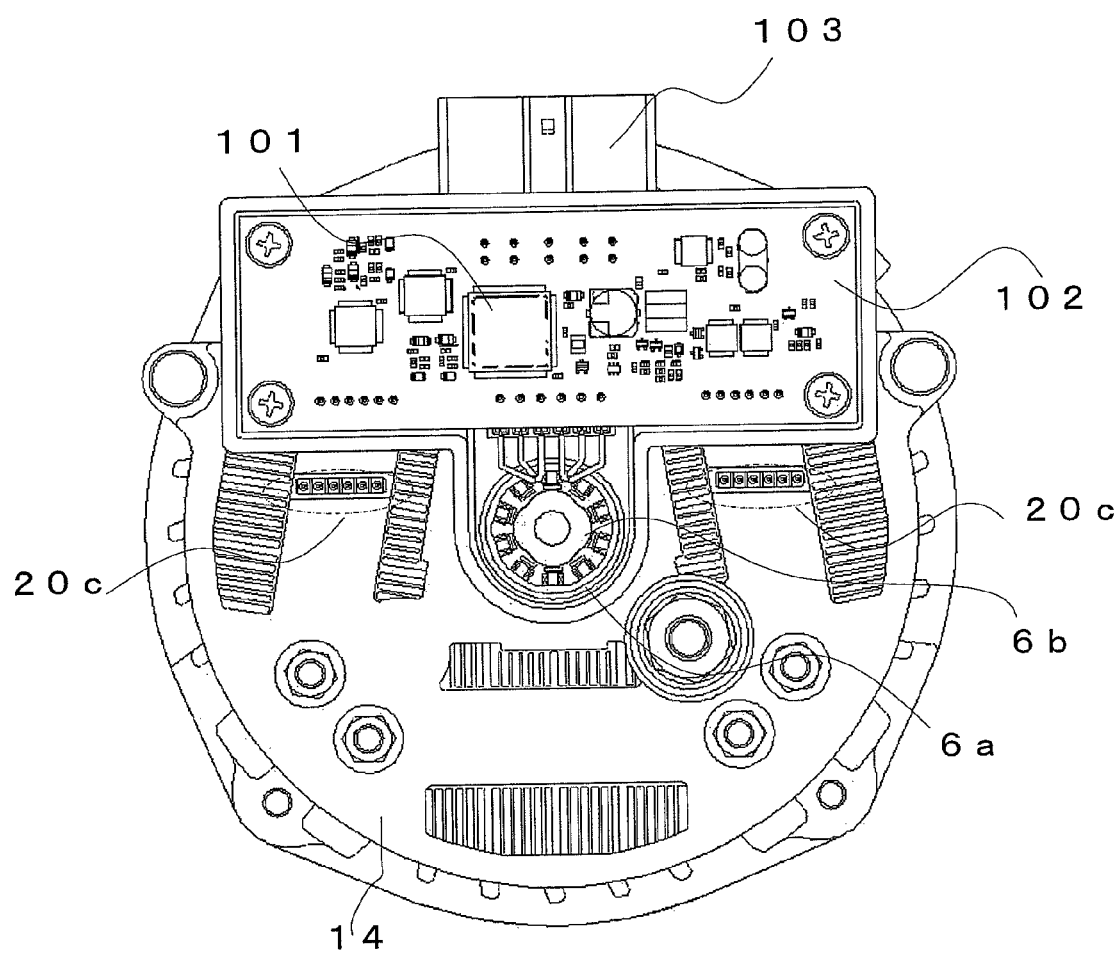
FIG. 11 is a rear view illustrating a controller-integrated electric rotating machine according to Embodiment 2 in the case where a metal cover is removed.

Embodiment 2 of the present invention will be explained. Constituent elements the same as or equivalent to those in Embodiment 1 are designated by the same reference characters, and the explanation thereof will be omitted. FIG. 7 is a cross-sectional view of a rotating electric machine according to Embodiment 2 of the present invention; FIG. 8 is an enlarged cross-sectional view of a stator current switching circuit unit; FIG. 9 is an elevation view of a relaying connection member into which signal conductors are inserted and molded; FIG. 10 is a perspective view of an assembly in which stator current switching circuit units are integrated in a relaying connection member; FIG. 11 is a rear view of the rotating electric machine in the case where a metal cover is removed. The basic configuration of the rotating electric machine is the same as that of the rotating electric machine according to Embodiment 1; therefore, the explanation thereof will be omitted. The difference between Embodiment 2 and Embodiment 1 is that, as the relaying connection member with which the stator current switching circuit units 13 are integrated, there is adopted a relaying connection member 20 into which the signal conductors 20a are inserted and molded. The relaying connection member 20 is illustrated in FIG. 9.

The stator current switching circuit unit 13 is provided with a plurality of switching elements 13a, a plurality of switching elements 13b, and an inner heat sink 13g and an outer heat sink 13h that are connected with the switching elements 13a and 13b, respectively, and serve as electrode members. Connection among the switching elements is performed with the heat sinks 13g and 13h and conductive members 17a and 18a that are inserted into the electric connection members 17 and 18, respectively, and molded. Connection between the stator current switching circuit unit 13 and the control circuit unit 102 is performed by means of the conductive member 17a that is inserted into the electric connection member 17 and molded, the signal conductor 20a that is inserted into the relaying connection member 20 and molded, and the relaying wiring member 14b that is inserted into the resin cover 14 and molded.

Next, the configuration of the approximately U-shaped relaying connection member 20 will be explained with reference to FIG. 9. By pressing the protrusion portion 17b, provided in the electric connection member 17 that is connected with the stator current switching circuit unit 13 for the corresponding phase, into a hole 20b provided in the relaying connection member 20, the relaying connection member 20 and the stator current switching circuit unit 13 for the corresponding phase are integrated with each other. The signal conductors 20a, inserted into the relaying connection member 20 and molded, are put together as terminals 20c. In addition, in the foregoing explanation, the protrusion portions provided in the electric connection member 17 are fit into the holes provided in the relaying connection member 20; however, the holes and the protrusion portions may be provided in the electric connection member 17 and the relaying connection member 20, respectively.

The stator current switching circuit units 13, for three phases, that are integrated with one another by means of the relaying connection member 20 are mounted on a rotating electric machine. After that, when the resin cover 14 is mounted, the terminals 20c are connected with the relaying wiring members 14b that are inserted into the cover 14 and molded. A resin 21 is filled into the connection portion between the conductive member 17a that is inserted and molded into the electric connection member 17 and the signal conductor 20a that is inserted and molded into the relaying connection member 20 and the connection portion between the signal conductor 20a that is inserted and molded into the relaying connection member 20 and the relaying wiring member 14b.

According to Embodiment 2, because, as is the case with Embodiment 1, the stator current switching circuit units 13 for three phases are integrated with one another, it goes without saying that mounting of the stator current switching circuit units 13 on the rotating electric machine is facilitated. Furthermore, the signal conductors 20a, inserted into the relaying connection member 20 and molded, are put together; therefore, the positional accuracy of the connection position for signal lines is raised, and when the resin cover 14 is assembled, the positional displacement of the connection position for signal lines is small. As a result, the assembly is facilitated, whereby the productivity can further be enhanced.

Embodiment 3

Figure 12:
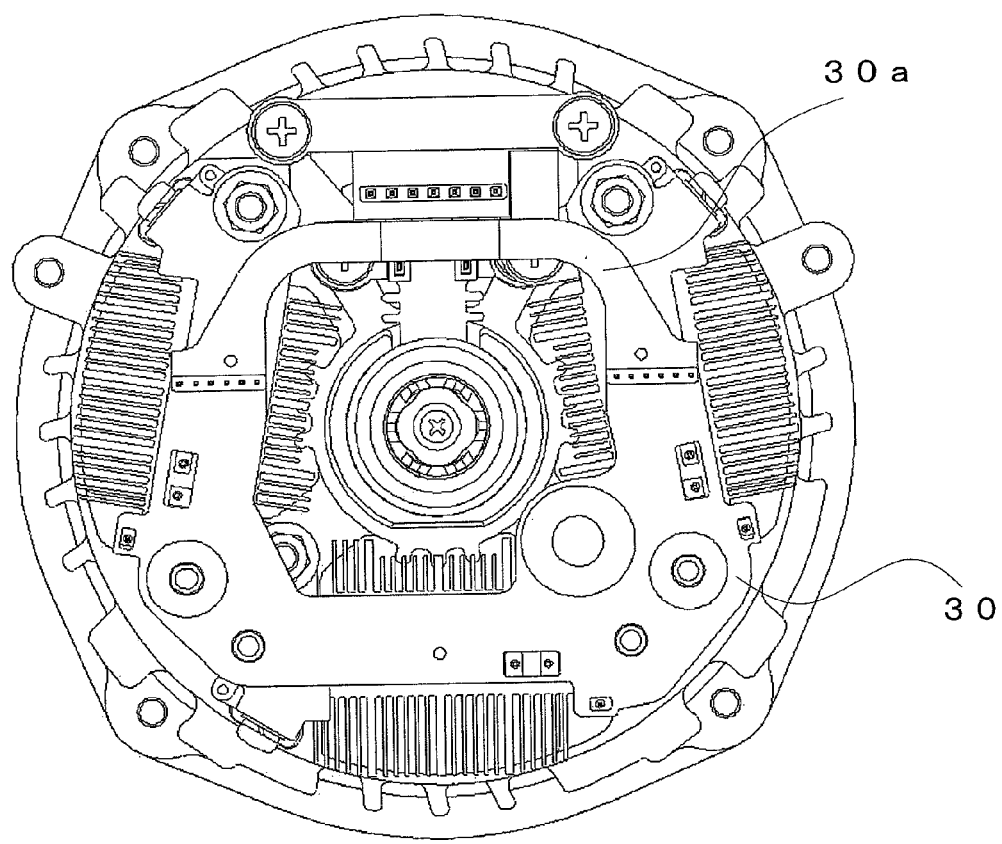
FIG. 12 is a rear view illustrating a controller-integrated electric rotating machine according to Embodiment 3 of the present invention in the case where a resin cover is removed.

Embodiment 3 of the present invention will be explained. Constituent elements the same as or equivalent to those in Embodiment 2 are designated by the same reference characters, and the explanation thereof will be omitted. FIG. 12 is a rear view of a rotating electric machine in the case where the cover 14 is removed. The basic configuration of the rotating electric machine is the same as that of the rotating electric machine according to Embodiment 2; therefore, the explanation thereof will be omitted.

In Embodiment 3, there is adopted a relaying connection member 30 in which there is provided a reinforcing bridge member 30a that connects both the open ends of the U-shaped relaying connection member in Embodiment 2. Because the reinforcing bridge member 30a is added to the relaying connection member 20 explained in Embodiment 2, the relaying connection member 30 is configured in a ring shape; thus, the strength of the relaying connection member can be enhanced. Other operations and effects are the same as those of Embodiments 1 and 2.

Embodiment 4

Figure 13:
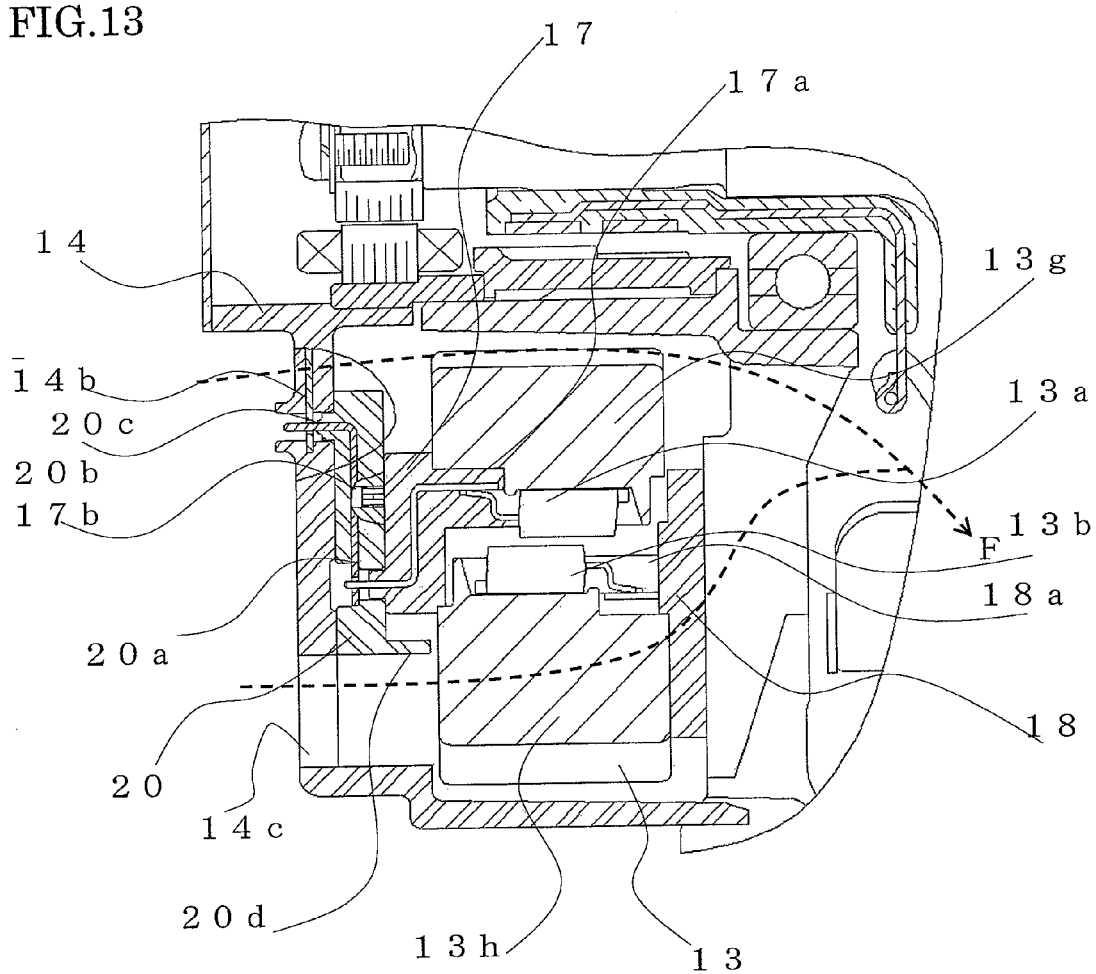
FIG. 13 is an enlarged cross-sectional view of a stator current switching circuit unit according to Embodiment 4 of the present invention.
Figure 14:
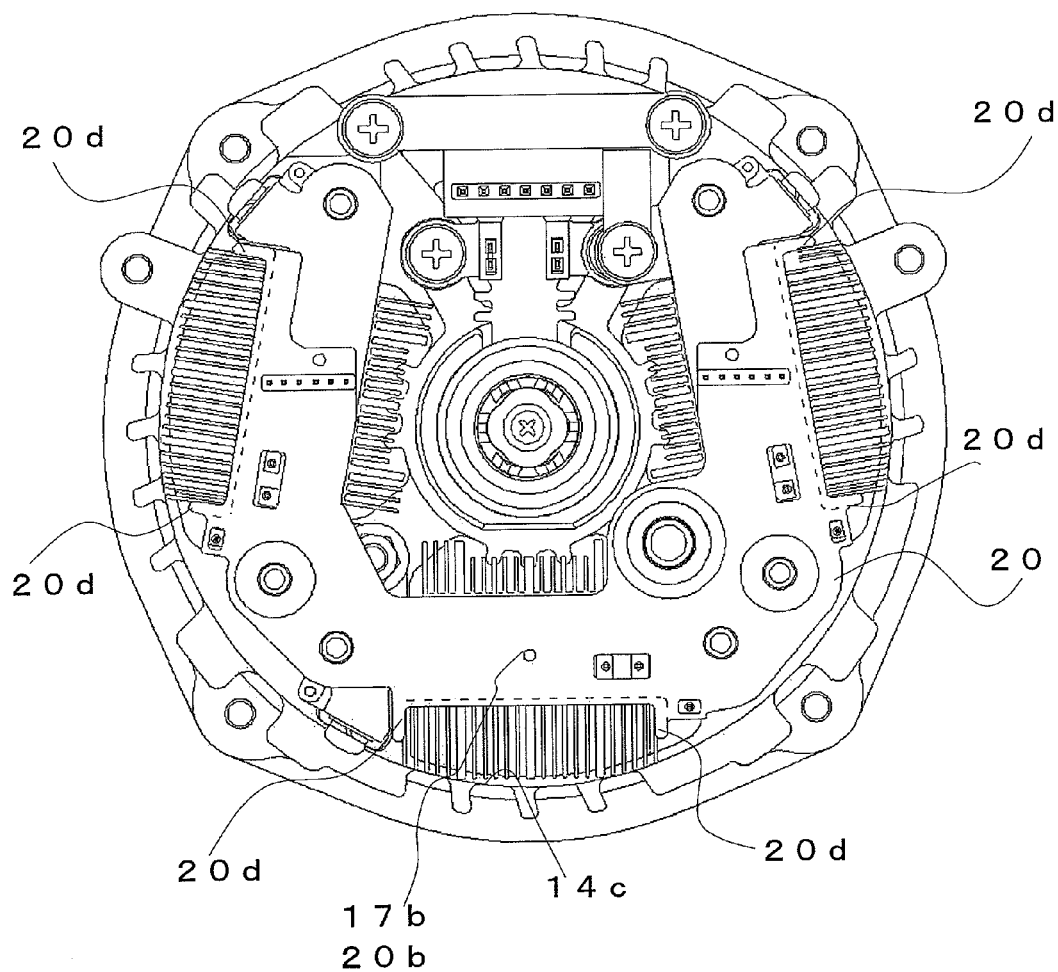
FIG. 14 is a rear view illustrating a controller-integrated electric rotating machine according to Embodiment 4 in the case where a metal cover is removed.

Embodiment 4 of the present invention will be explained. Constituent elements the same as or equivalent to those in Embodiment 2 are designated by the same reference characters, and the explanation thereof will be omitted. FIG. 13 is an enlarged cross-sectional view of a stator current switching circuit unit in a rotating electric machine according to Embodiment 4 of the present invention; FIG. 14 is a rear view of a rotating electric machine in the case where the cover 14 is removed. The basic configuration of the rotating electric machine is the same as that of the rotating electric machine according to Embodiment 2; therefore, the explanation thereof will be omitted.

In Embodiment 4, wind path creation members 20d are formed in the relaying connection member 20. The wind path creation member 20d protrudes from the relaying connection member 20 toward the cooling fins over almost the overall width of the cooling fin of the outer heat sink 13h so that air is guided from the ventilation hole 14c to the cooling fins. By providing the wind path creation member 20d, intake air flows smoothly, whereby the coolability can be raised; therefore, because it is not required to provide an extra wind path creation member, the cost can be reduced. Character F in FIG. 13 indicates the flow of air. Other constituent elements demonstrate the same effects as those of Embodiments 1 and 2.

In addition, although, in Embodiment 4, there has been explained an example in which a wind path creation member is provided in the relaying connection member 20 described in Embodiment 2; however, the wind path creation member may be provided in the relaying connection member 16 of Embodiment 1.

Embodiment 5

Figure 15:
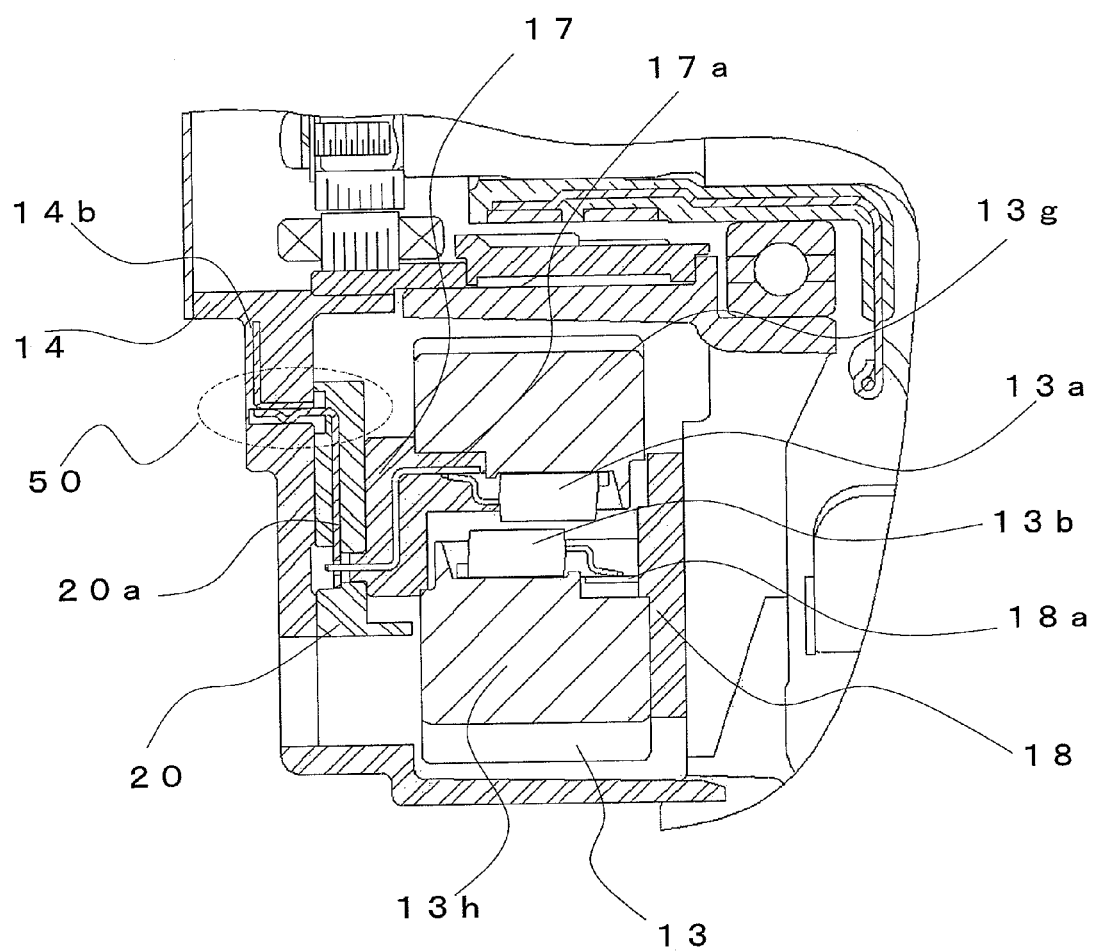
FIG. 15 is an enlarged cross-sectional view of a stator current switching circuit unit according to Embodiment 5 of the present invention.
Figure 16:
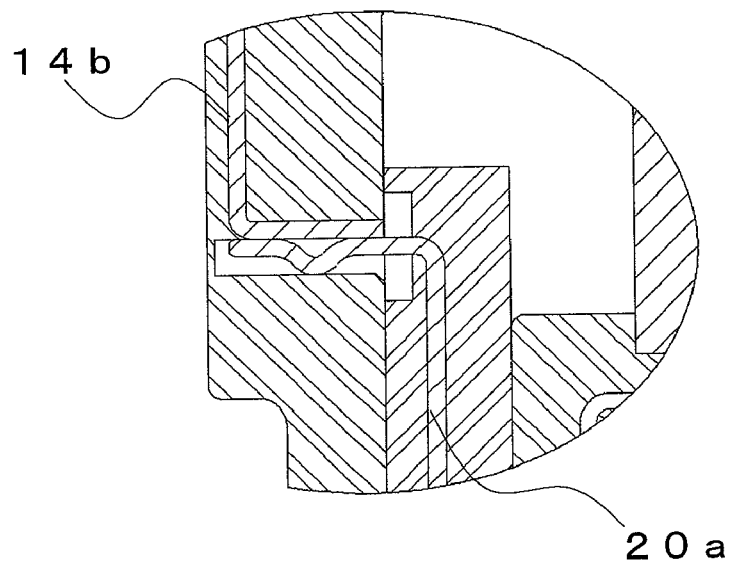
FIG. 16 is a set of enlarged cross-sectional views illustrating a connecter connection portion according to Embodiment 5.
Figure 16:
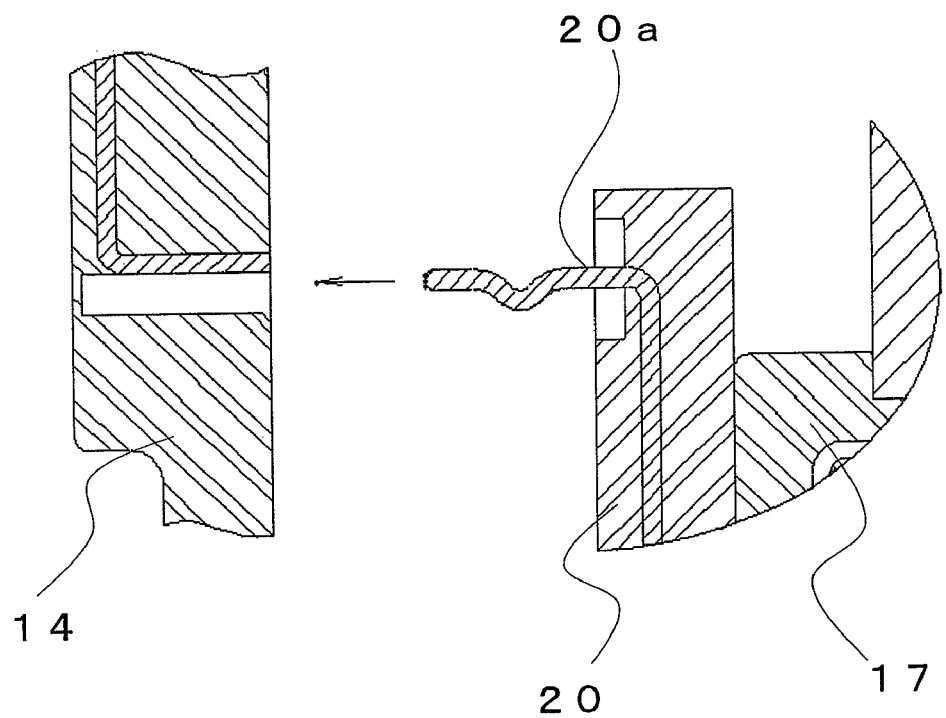

Embodiment 5 of the present invention will be explained. Constituent elements the same as or equivalent to those in Embodiment 2 are designated by the same reference characters, and the explanation thereof will be omitted. FIG. 15 is an enlarged cross-sectional view of a stator current switching circuit unit in a rotating electric machine according to Embodiment 5 of the present invention; FIG. 16 is an enlarged view of the principal parts thereof. The basic configuration of the rotating electric machine is the same as that of the rotating electric machine according to Embodiment 2; therefore, the explanation thereof will be omitted.

In Embodiment 5, the respective electric connection portions of the signal conductor 20a that is inserted and molded into the relaying connection member 20 and the terminal 14b that is inserted and molded into the cover 14 are detachably and attachably connected with each other, by means of a connecter unit 50. For example, as illustrated in FIG. 9, the signal conductors 20a are put together as a terminal 20c. The terminal 20c and the terminal 14b are connected with each other, as a connecter. FIGS. 16(a) and 16(b) are enlarged views of the connecter 50, in the case where the connecter has been connected and in the case where the connecter has not been disconnected, respectively.

As described above, the connection of signal lines are performed by means of a connecter, the assembly of the stator current switching circuit units is further facilitated; thus, the productivity is improved. Moreover, when the rotating electric machine is repaired, the stator current switching circuit units can readily be detached. Other constituent elements demonstrate the same effects as those of Embodiment 2.

Various modifications and alterations of this invention will be apparent to those skilled in the art without departing from the scope and spirit of this invention, and it should be understood that this is not limited to the illustrative embodiments set forth herein.

What is claimed is:

1. A controller-integrated rotating electric machine comprising:
   a rotor having a rotation axle;
   a stator that is disposed in such a way as to surround the rotor and has a stator winding;
   a rotating electric machine unit having a pair of brackets that holds the rotor and the stator;
   a plurality of stator current switching circuit units that are attached on an insulator cover mounted on the bracket and control electric currents that flow in the stator; and
   a controller unit having a control circuit board that is electrically connected with the stator current switching circuit units,
   wherein each of the stator current switching circuit units is provided with a plurality of switching elements, a pair of heat sinks with which the drain terminals of the switching elements are connected, and a pair of electric connection members that pull out the terminals of the switching elements and that hold and integrate the pair of heat sinks,
   wherein the plurality of stator current switching circuit units is fixed to a relaying connection member, and electric connections between the stator current switching circuit units and outside members are performed by the intermediary of the relaying connection member, and
   wherein electric connection between the stator current switching circuit unit and the control circuit board is performed by means of a signal conductor that is inserted into the relaying connection member and molded and whose connection ends are put together in a terminal and the relaying wiring member that is inserted into the insulator cover and molded.

2. The controller-integrated rotating electric machine according to claim 1, wherein the stator current switching circuit unit is fixed to the relaying connection member through fitting between a protrusion portion (or hole) provided in the stator current switching circuit unit and a hole (or protrusion portion) provided in the relaying connection member.

3. The controller-integrated rotating electric machine according to claim 1, wherein the relaying connection member is approximately u-shaped and does not cover cooling fins provided in the heat sink.

4. The controller-integrated rotating electric machine according to claim 1, wherein the relaying connection member is ring-shaped and does not cover cooling fins provided in the heat sink.

5. The controller-integrated rotating electric machine according to claim 1, wherein there is provided a wind path creation member that protrudes from the relaying connection member toward the cooling fins over almost the overall width of the cooling fin of the heat sink so that a ventilation path to the cooling fins is created.

6. The controller-integrated rotating electric machine according to claim 1, wherein the electric connection portion between the stator current switching circuit unit and a signal conductor provided in the relaying connection member is embedded in a resin.

7. The controller-integrated rotating electric machine according to claim 1, wherein the terminal of the signal conductor provided in the relaying connection member and the relaying wiring member are connected with each other by means of a detachable and attachable connecter.

* * * * *